United States Patent
Wei et al.

(10) Patent No.: US 11,546,035 B2
(45) Date of Patent: Jan. 3, 2023

(54) EVENT DETECTION METHOD AND SYSTEM THEREOF

(71) Applicant: Wistron NeWeb Corporation, Hsinchu (TW)

(72) Inventors: Ya-Ping Wei, Hsinchu (TW);
Chui-Chu Cheng, Hsinchu (TW);
Horen Chen, Hsinchu (TW);
Wang-Hsing Huang, Hsinchu (TW);
Yi-An Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 69 days.

(21) Appl. No.: 17/140,166

(22) Filed: Jan. 4, 2021

(65) Prior Publication Data

US 2021/0211174 A1    Jul. 8, 2021

Related U.S. Application Data

(60) Provisional application No. 62/957,944, filed on Jan. 7, 2020.

(51) Int. Cl.

| | | |
|---|---|---|
| *H04N 7/18* | (2006.01) | |
| *H04B 7/06* | (2006.01) | |
| *G06N 3/02* | (2006.01) | |
| *G06V 20/52* | (2022.01) | |

(52) U.S. Cl.
CPC ............ *H04B 7/0626* (2013.01); *G06N 3/02* (2013.01); *G06V 20/52* (2022.01); *H04N 7/181* (2013.01)

(58) Field of Classification Search
CPC ........ G06N 3/0454; G06N 3/084; G06N 3/08; G06N 3/04; G06N 3/082; G06N 3/006; G06N 3/0427; G06N 3/0445; G06N 3/088; G06N 7/005
USPC ........................................................ 348/143
See application file for complete search history.

(56) References Cited

U.S. PATENT DOCUMENTS

| | | | |
|---|---|---|---|
| 2017/0323184 A1* | 11/2017 | Philipose | G06K 9/628 |
| 2018/0342081 A1* | 11/2018 | Kim | G06T 7/254 |
| 2020/0382228 A1* | 12/2020 | Studer | H04B 7/0842 |

* cited by examiner

*Primary Examiner* — Masum Billah
(74) *Attorney, Agent, or Firm* — McClure, Qualey & Rodack, LLP (57) ABSTRACT

An event detection method is for detecting if an event being predetermined exists in a detected environment, in which a first wireless unit, at least one second wireless unit wirelessly communicating with the first wireless unit, and at least one cooperating detection device are disposed. The event detection method includes a live CSI data obtaining step, a live CSI data reducing step, a cooperating data obtaining step and an event determining step. The live CSI data reducing step includes reducing a size of a plurality of live CSI data to generate a plurality of preprocessed live CSI data. The event determining step includes inputting the preprocessed live CSI data to an event classifier and processing a plurality of cooperating data to determine if the event exists.

14 Claims, 8 Drawing Sheets

EVENT DETECTION METHOD AND SYSTEM THEREOF

RELATED APPLICATIONS

This application claims priority to U.S. Provisional Application Ser. No. 62/957,944, filed on Jan. 7, 2020, which is herein incorporated by reference.

BACKGROUND

Technical Field

The present disclosure relates to an event detection method and a system thereof. More particularly, the present disclosure relates to an event detection method and a system thereof for detecting a dynamic event.

Description of Related Art

In recent years, with increasing market demand of health care and aging populations, they are driving development for detecting or monitoring dynamic events or behaviors of a person. For detecting a dynamic event, the existing technique mainly employs a wearable accelerometer to measure the vibration. Some other devices employ an acoustic mechanism to detect the sound produced from human behavior.

However, such as wearable or contact devices lead to usage inconveniences so as to miss the event being detected. Accordingly, there is an urgent need in the market for a convenient and effectively monitored event detection method and system thereof.

SUMMARY

According to one aspect of the present disclosure, an event detection method is for detecting if an event being predetermined exists in a detected environment, in which a first wireless unit, at least one second wireless unit wirelessly communicating with the first wireless unit, and at least one cooperating detection device are disposed. The event detection method includes a live CSI (Channel State Information) data obtaining step, a live CSI data reducing step, a cooperating data obtaining step and an event determining step. The live CSI data obtaining step includes obtaining a plurality of live CSI data corresponding to a plurality of original subcarriers and an inference time from the first wireless unit, and the live CSI data are wirelessly transmitted from the at least one second wireless unit to the first wireless unit. The live CSI data reducing step includes reducing a size of the live CSI data to generate a plurality of preprocessed live CSI data. The cooperating data obtaining step includes obtaining a plurality of cooperating data from the cooperating detection device, which is at least one of a camera, a microphone and an accelerometer. The event determining step includes inputting the preprocessed live CSI data to an event classifier and processing the cooperating data to determine if the event exists.

According to another aspect of the present disclosure, an event detection method is for detecting if an event being predetermined exists in a detected environment, in which a first wireless unit and at least one second wireless unit wirelessly communicating with the first wireless unit are disposed. The event detection method includes a classifier establishing step, an environmental CSI data obtaining step, an environmental CSI data reducing step, a live CSI data obtaining step, a live CSI data reducing step and an event determining step. The classifier establishing step includes establishing an event classifier. The environmental CSI data obtaining step includes obtaining a plurality of environmental CSI data corresponding to a plurality of original subcarriers and an inference time from the first wireless unit when the detected environment is in an empty state, and the environmental CSI data are wirelessly transmitted from the at least one second wireless unit to the first wireless unit. The environmental CSI data reducing step includes reducing a size of the environmental CSI data to generate and store as a plurality of preprocessed environmental CSI data. The live CSI data obtaining step includes obtaining a plurality of live CSI data corresponding to the original subcarriers and the inference time from the first wireless unit, and the live CSI data are wirelessly transmitted from the at least one second wireless unit to the first wireless unit. The live CSI data reducing step includes reducing a size of the live CSI data to generate a plurality of preprocessed live CSI data. The event determining step includes inputting the preprocessed environmental CSI data and the preprocessed live CSI data to the event classifier to determine if the event exists.

According to further another aspect of the present disclosure, an event detection system is for detecting if an event being predetermined exists in a detected environment. The event detection system includes a first wireless unit, at least one second wireless unit, a processor and a memory. The first wireless unit is disposed in the detected environment. The least one second wireless unit is disposed in the detected environment and wirelessly communicating with the first wireless unit. The processor is coupled to the first wireless unit. The memory is coupled to the processor and configured to provide an event detection module, which includes an event classifier. The processor in accordance with the event detection module is configured to obtain a plurality of environmental CSI data corresponding to a plurality of original subcarriers and an inference time from the first wireless unit when the detected environment is in an empty state, wherein the environmental CSI data are wirelessly transmitted from the at least one second wireless unit to the first wireless unit, reduce a size of the environmental CSI data to generate and store as a plurality of preprocessed environmental CSI data, obtain a plurality of live CSI data corresponding to the original subcarriers and the inference time from the first wireless unit, wherein the live CSI data are wirelessly transmitted from the at least one second wireless unit to the first wireless unit, reduce a size of the live CSI data to generate a plurality of preprocessed live CSI data, and input the preprocessed environmental CSI data and the preprocessed live CSI data to the event classifier to determine if the event exists.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiments, the practical details is unnecessary. In addition, for simplifying the drawings, some conventional structures and elements will be simply illustrated, and repeated elements may be represented by the same labels.

Figure 1A:
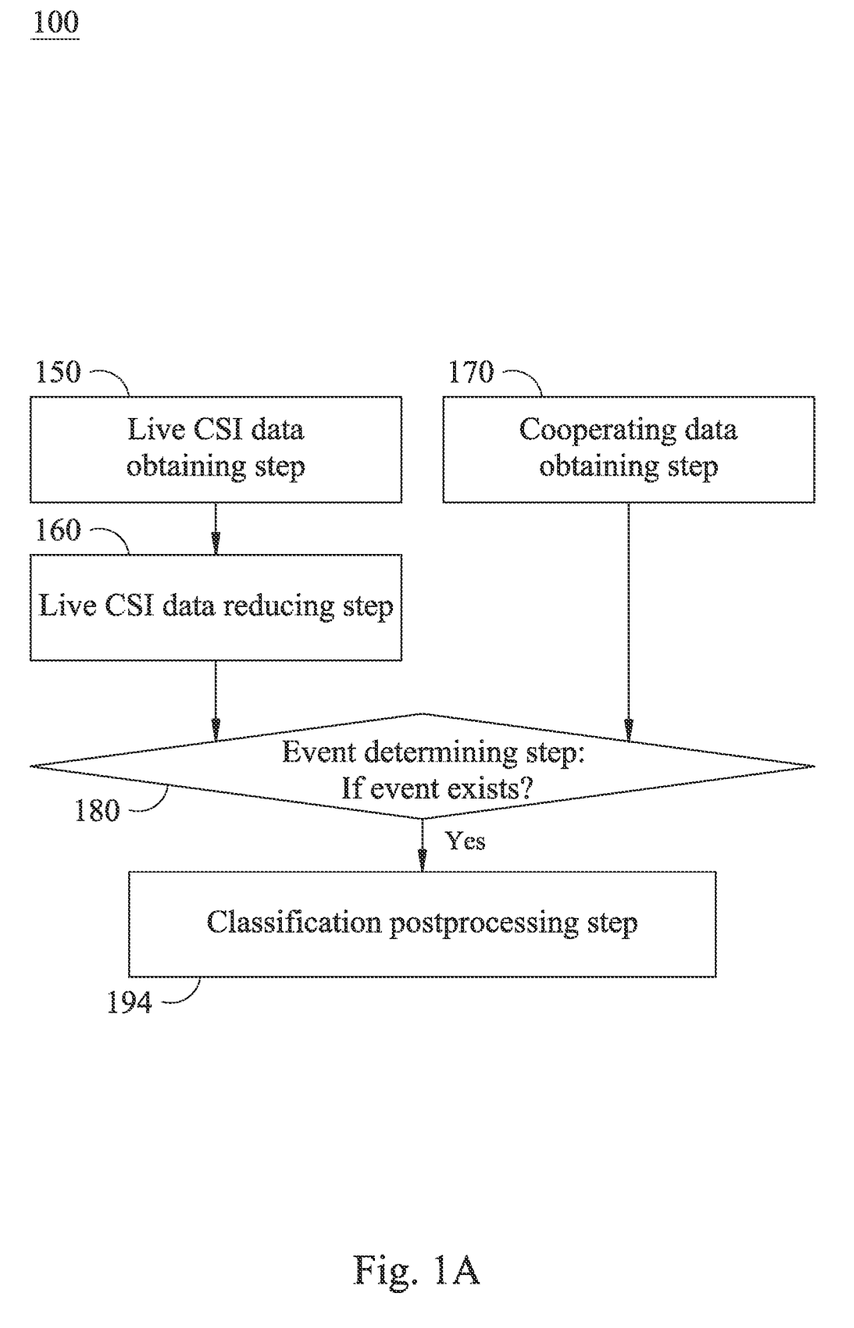
FIG. 1A is a flow chart of an event detection method according to the 1st embodiment of the present disclosure.
Figure 2A:
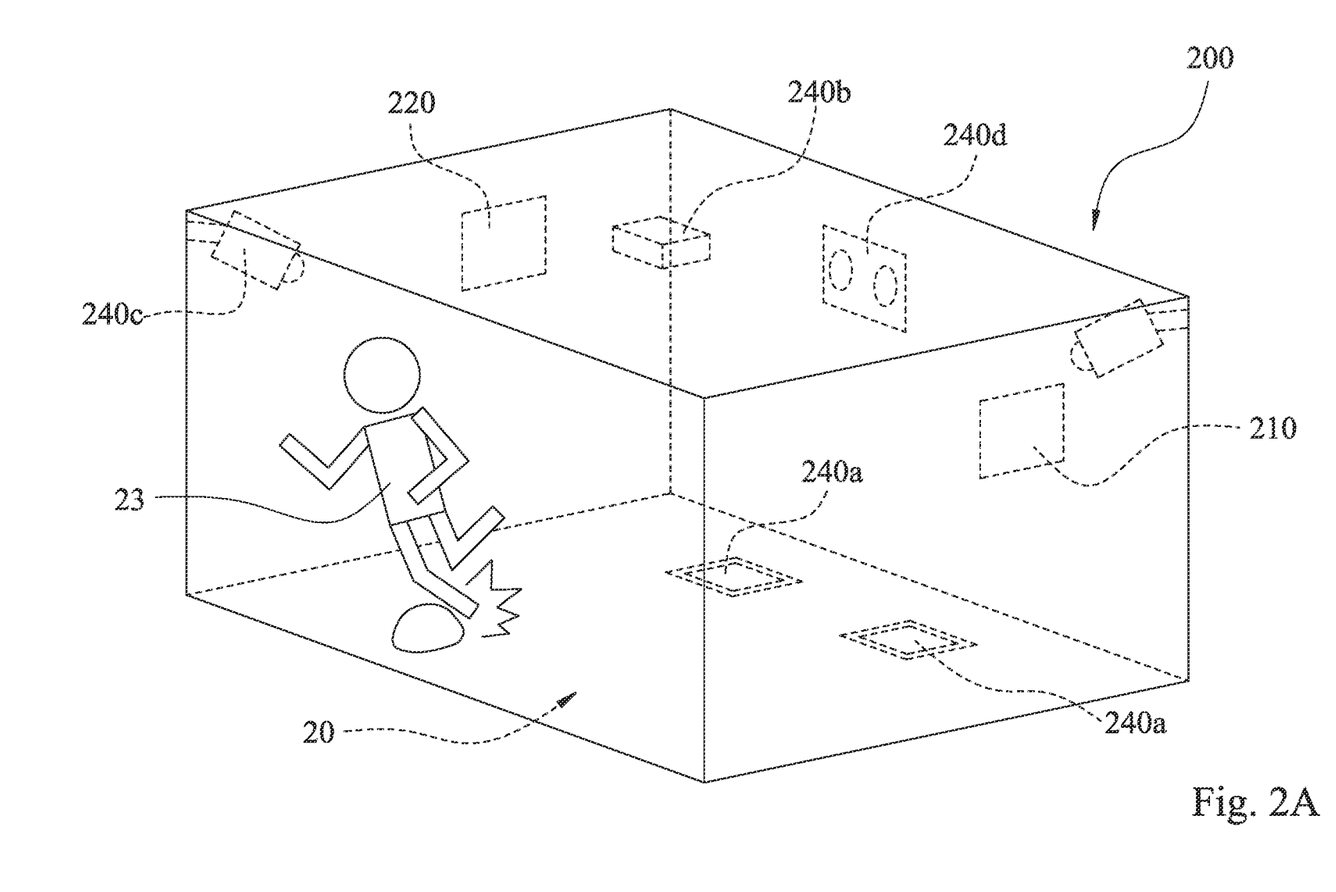
FIG. 2A is a schematic view of an event detection system according to the 2nd embodiment of the present disclosure.
Figure 2B:
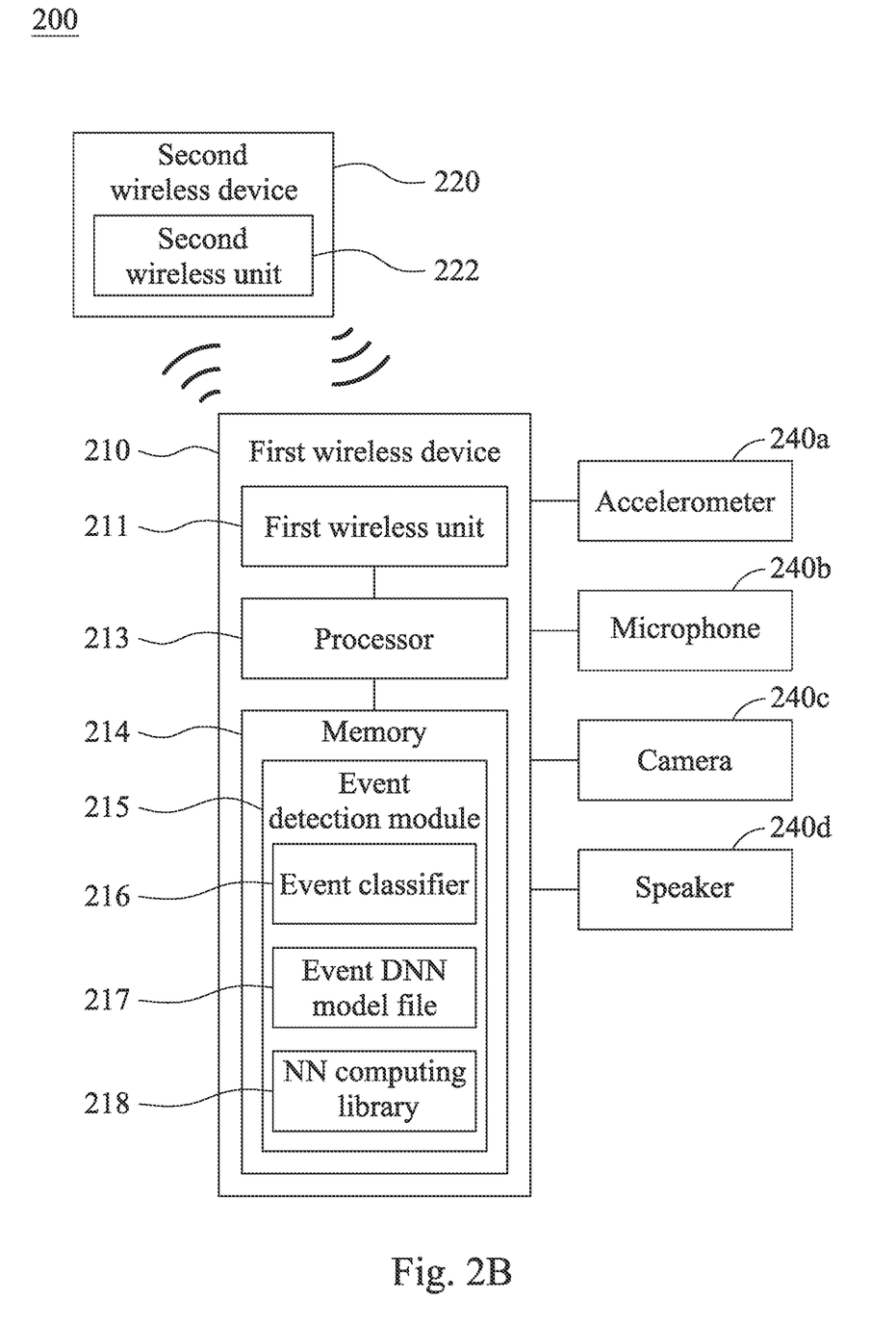
FIG. 2B is a block diagram of the event detection system according to the 2nd embodiment.

FIG. 1A is a flow chart of an event detection method 100 according to the 1st embodiment of the present disclosure. FIG. 2A is a schematic view of an event detection system 200 according to the 2nd embodiment of the present disclosure. FIG. 2B is a block diagram of the event detection system 200 according to the 2nd embodiment. With reference to FIG. 1A, FIG. 2A and FIG. 2B, the event detection method 100 according to the 1st embodiment is described with an aid of the event detection system 200 according to the 2nd embodiment of the present disclosure. The event detection method 100 is for detecting if an event being predetermined exists in a detected environment 20, in which a first wireless unit 211 and at least one second wireless unit 222 wirelessly communicating with the first wireless unit 211 are disposed. The event detection method 100 includes a live CSI (Channel State Information) data obtaining step 150, a live CSI data reducing step 160 and an event determining step 180.

The live CSI data obtaining step 150 includes obtaining a plurality of live (i.e., real time) CSI data corresponding to a plurality of original subcarriers and an inference time from the first wireless unit 211, and the live CSI data are wirelessly transmitted from the at least one second wireless unit 222 to the first wireless unit 211. The live CSI data is a function of and depends on the original subcarriers and a plurality time points of the inference time. The live CSI data reducing step 160 includes reducing a size of the live CSI data to generate a plurality of preprocessed live CSI data. The event determining step 180 includes inputting the preprocessed live CSI data to an event classifier 216 to determine if the event exists.

Furthermore, the event detected by the event detection method 100 may be a dynamic event of a person 23, an animal, an object, etc., and the dynamic event may be a falling event, a moving event, etc. The detected environment 20 may be an indoor environment. The first wireless unit 211 is disposed in a first wireless device 210 and may be a transceiver that includes an antenna, a RF (Radio Frequency) circuit, a modem circuit, etc. The second wireless unit 222 is disposed in a second wireless device 220 and may be a transceiver that includes an antenna, a RF circuit, a modem circuit, etc. The first wireless device 210 and the at least one second wireless device 220 are wirelessly communicating over a Wi-Fi communication that has multiple subcarriers with frequencies around 2.4 GHz or 5 GHz, e.g., IEEE 802.11. The first wireless device 210 may be a router, an access point (AP), an extender, a base station, etc. that includes at least two, 2×2, 4×4, or more omnidirectional or directional antennas. A processor 213 and a memory 214 with the event detection function are disposed and configured in the first wireless device 210. In another embodiment of the present disclosure, a processor and a memory with the event detection function are disposed and configured in a stand-alone device, which is coupled to the first wireless device 210. The second wireless device 220 may be a client device, a user equipment, a household device, e.g., a television, a laundry machine, etc., with the second wireless unit 222. Alternately, the first wireless device 210 may be a client device, and the second wireless device 220 may be an access point. The at least one second wireless unit 222 and the first wireless unit 211 are responsible for transmitting and receiving CSI data in the detected environment 20. The classifying manners of the event classifier 216 and any classifier in the present disclosure may be deep neural network (i.e., DNN) classifying, machine learning, algorithm calculating, looking-up a table, etc.

According to the event detection method 100 of the present disclosure, at least one cooperating detection device may be further disposed in the detected environment 20. The event detection method 100 may further include a cooperating data obtaining step 170. The cooperating data obtaining step 170 includes obtaining a plurality of cooperating data from the cooperating detection device, which is at least one of a camera 240c, a microphone 240b and an accelerometer 240a. The event determining step 180 may further include processing the cooperating data to determine if the event exists. Therefore, the event detection method 100 includes several sensing detectors at the same time, i.e., integrates multiple detection manners, and thereby confirms at multiple levels to reduce the false alarm rate of detecting the event. During the detection phase, the information collected through the wireless signals of CSI, signals of movement speed, sound, and image/video are used as the basis for analyzing whether the event, e.g., falling, exists.

Figure 1B:
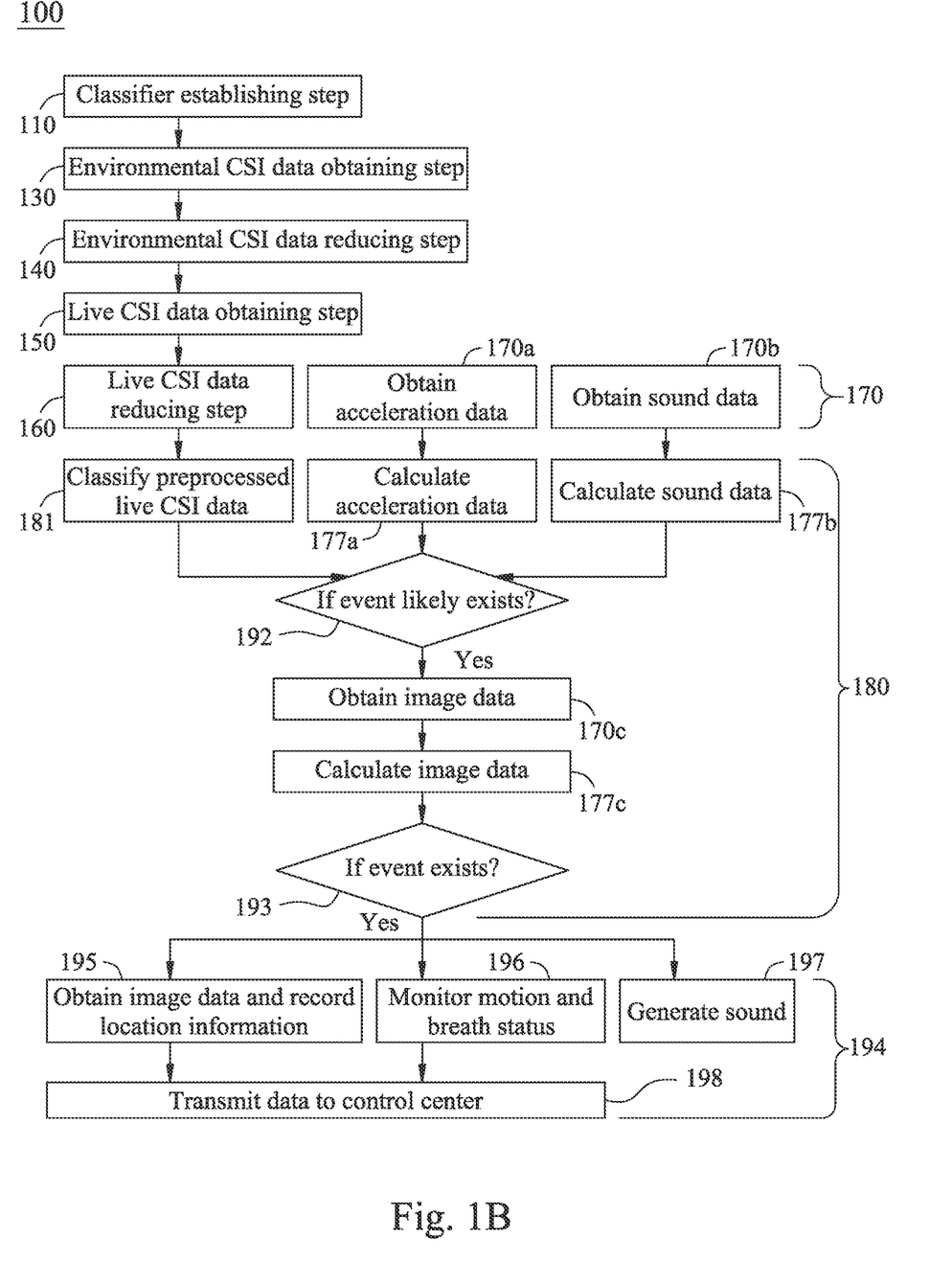
FIG. 1B is another flow chart of the event detection method according to the 1st embodiment.

FIG. 1B is a detailed flow chart of the event detection method 100 according to the 1st embodiment. With reference to FIG. 1B, FIG. 2A and FIG. 2B, the event detection method 100 may further include a classifier establishing step 110, an environmental CSI data obtaining step 130 and an environmental CSI data reducing step 140 before the live CSI data obtaining step 150, the live CSI data reducing step 160 and the event determining step 180. The classifier establishing step 110 includes establishing the event classifier 216. The environmental CSI data obtaining step 130 includes obtaining a plurality of environmental CSI data corresponding to the original subcarriers and the inference time from the first wireless unit 211 when the detected environment 20 is in an empty state, and the environmental CSI data are wirelessly transmitted from the at least one second wireless unit 222 to the first wireless unit 211. The environmental CSI data is a function of and depends on the original subcarriers and the time points of the inference time. The detected environment 20 being in the empty or static state indicates that none of a person, an animal or a detected object causing the event is located in the detected environment 20. The environmental CSI data reducing step 140 includes reducing a size of the environmental CSI data to generate and store as a plurality of preprocessed environmental CSI data in the memory 214. The event determining step 180 includes inputting the preprocessed live CSI data and further the preprocessed environmental CSI data to the event classifier 216, and processing the cooperating data to determine if the event exists. Therefore, at least one of the amplitudes and phases of the CSI information can be employed to determine whether the event happens, e.g., someone in the detected environment 20 accidentally falls.

In the 1st embodiment, the environmental CSI data obtaining step 130 and the live CSI data obtaining step 150 are specifically performed by the processor 213 in accordance with an event detection module 215 of the memory 214 to obtain the environmental CSI data and the live CSI data, respectively, from the first wireless unit 211. The environmental CSI data reducing step 140, the live CSI data reducing step 160 and the event determining step 180 are specifically performed by the processor 213 in accordance with the event detection module 215 of the memory 214. The cooperating data obtaining step 170 and a classification postprocessing step 194 are specifically performed by the processor 213 in accordance with the event detection module 215 of the memory 214 to activate the cooperating detection devices, e.g., the accelerometer 240a, the microphone 240b, the camera 240c, the speaker 240d, etc.

In detail, the event classifier 216 may be a deep neural network classifier and trained by a plurality of labeled CSI data received under the event, e.g., the falling event, in at least one environment (may be or may not be the detected environment 20), a plurality of labeled CSI data received under at least one event other than the event, e.g., a non-falling event, in the at least one environment, and a plurality of labeled CSI data received in the at least one environment in the empty state, e.g., none of a person and an animal exists in the at least one environment. Therefore, for the training of the event classifier 216, the differences among the labeled CSI data received under the event, being other than the event and in the empty state are beneficial to accurately detect the event in the event detection method 100.

Figure 1C:
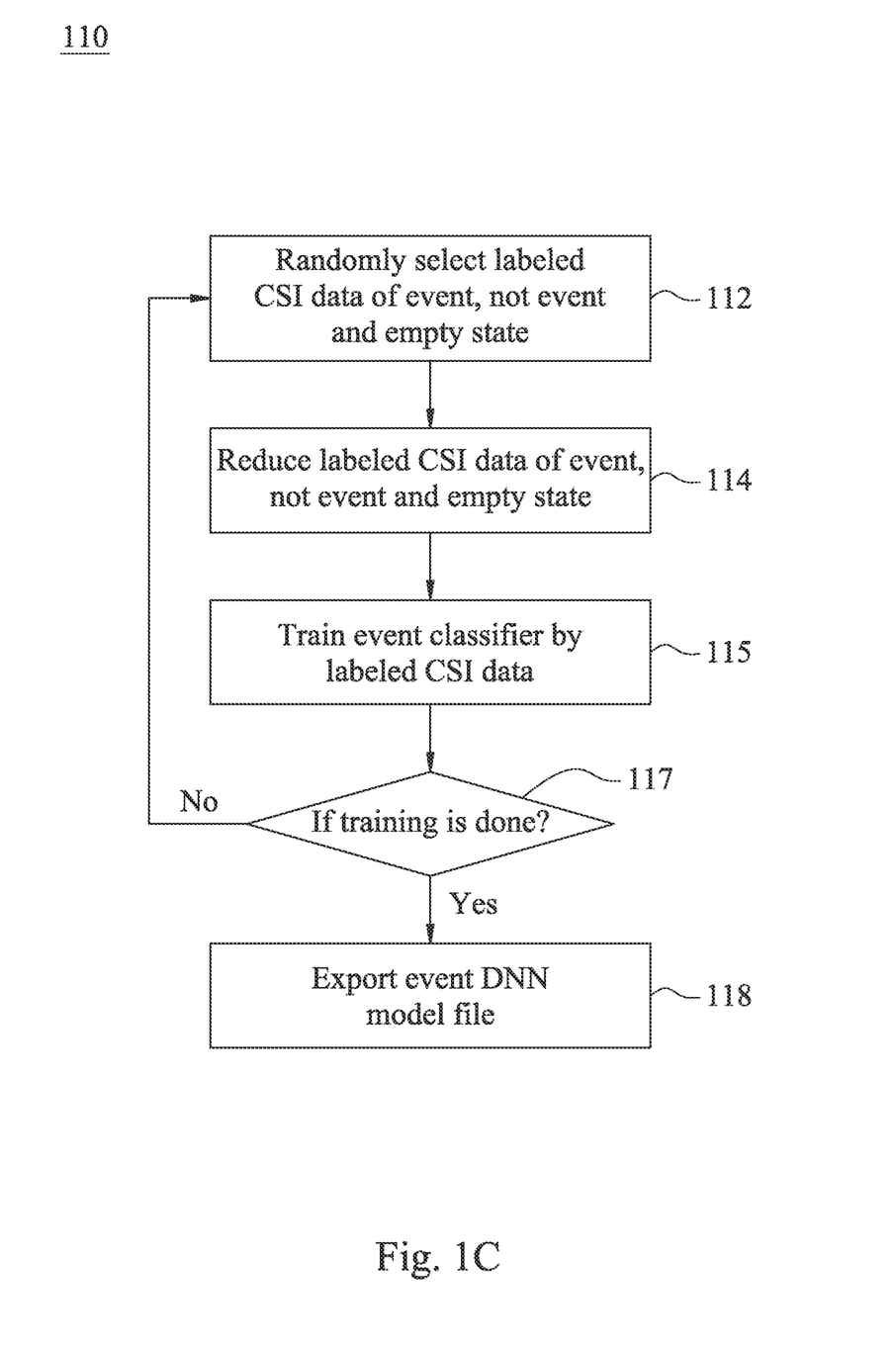
FIG. 1C is a flow chart of a classifier establishing step of the event detection method according to the 1st embodiment.

FIG. 1C is a flow chart of the classifier establishing step 110 of the event detection method 100 according to the 1st embodiment. With reference to FIG. 1C, FIG. 2A and FIG. 2B, the classifier establishing step 110 includes establishing the event classifier 216, which may include steps 112, 114, 115, 117 and 118, as shown in FIG. 1C. The step 112 is randomly selecting a batch of each of the aforementioned three kinds of the labeled CSI data, which are the labeled CSI data received under the event in at least one environment, the labeled CSI data received under at least one event other than the event in the at least one environment, and the labeled CSI data received in the at least one environment in the empty state. Each of the aforementioned three kinds of the labeled CSI data may be received under multiple conditions, e.g., multiple conditions or types of the falling event. The step 114 is reducing a size of each of the three kinds of the labeled CSI data that are randomly selected in the step 112. In the step 115, the event classifier 216 is trained by each of the three kinds of the labeled CSI data that are generated in step 114. In the step 117, it is determined to be followed by the step 118 if training the event classifier 216 in the step 115 is done, or it is determined to return to the step 112 if training the event classifier 216 in the step 115 is not done. The step 118 is exporting an event DNN model file 217 for the event classifier 216. In the 1st embodiment, the pre-trained event DNN model file 217 is then installed to the first wireless device 210 to support the following real-time inference, as a function to map the preprocessed live CSI data to the event or being not the event.

Figure 1D:
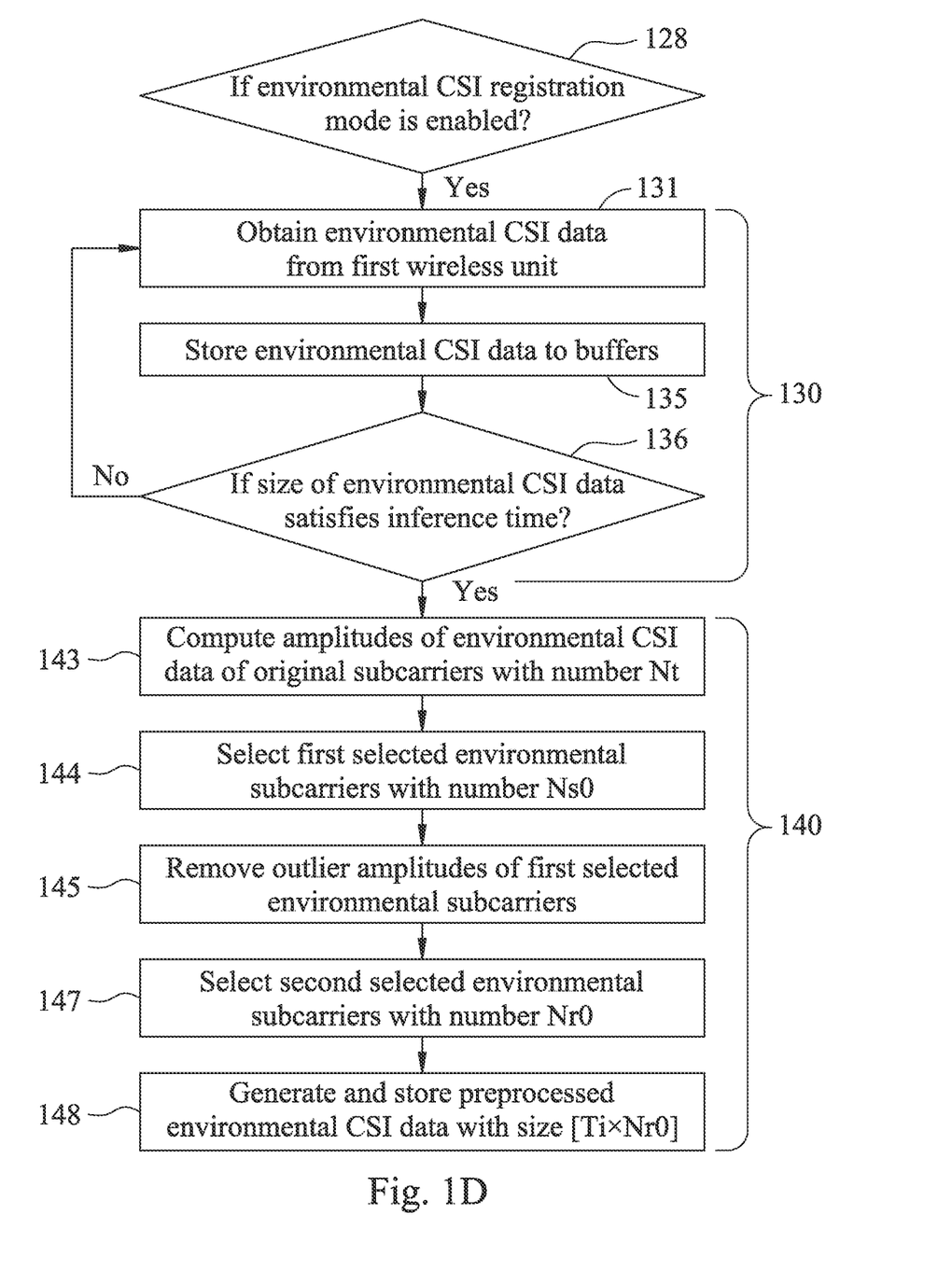
FIG. 1D is a flow chart of an environmental CSI data obtaining step and an environmental CSI data reducing step of the event detection method according to the 1st embodiment.

FIG. 1D is a flow chart of the environmental CSI data obtaining step 130 and the environmental CSI data reducing step 140 of the event detection method 100 according to the 1st embodiment. With reference to FIG. 1D, FIG. 2A and FIG. 2B, in step 128, it is determined to be followed by the environmental CSI data obtaining step 130 if an environmental CSI registration mode for the detected environment 20 is enabled. The environmental CSI data obtaining step 130 includes obtaining the environmental CSI data corresponding to the original subcarriers and the inference time from the first wireless unit 211 when the detected environment 20 is in the empty state, which may include steps 131, 135 and 136, as shown in FIG. 1D. The step 131 is obtaining the environmental CSI data of the original subcarriers from the first wireless unit 211. The step 135 is storing the environmental CSI data of the original subcarriers to buffers, i.e., buffering each time series of the environmental CSI data/packets of the original subcarriers. In the step 136, it is determined to be followed by the environmental CSI data reducing step 140 if the size of the environmental CSI data stored in the buffers is large enough to satisfy the inference time (i.e., the inference window size), or it is determined to return to the step 131 if the size of the environmental CSI data stored in the buffers is not large enough to satisfy the inference time.

The environmental CSI data reducing step 140 includes reducing the size of the environmental CSI data to generate and store as the preprocessed environmental CSI data, which may include steps 143, 144, 145, 147 and 148, as shown in FIG. 1D. The step 143 is computing an amplitude of each of the environmental CSI data corresponding to the time points of the inference time and the original subcarriers, a number of the time points of the inference time is Ti, and a number of the original subcarriers is Nt. The step 144 is selecting a plurality of first selected environmental subcarriers (i.e., a subset of the original subcarriers) from the original subcarriers, in accordance with the amplitudes of the environmental CSI data corresponding to the time points of the inference time and the original subcarriers. A number of the first selected environmental subcarriers is Ns0, and the number Ns0 of the first selected environmental subcarriers is smaller than the number Nt of the original subcarriers. In the step 145, outliers, which may be caused by thermal noise or other electrical interference, among the amplitudes of the environmental CSI data corresponding to the time points of the inference time and the first selected environmental subcarriers are removed or set as a predetermined value. The step 147 is selecting a plurality of second selected environmental subcarriers (i.e., a subset of the first selected environmental subcarriers) from the first selected environmental subcarriers by PCA (Principal Component Analysis). A number of the second selected environmental subcarriers is Nr0, and the number Nr0 of the second selected environmental subcarriers is smaller than the number Ns0 of the first selected environmental subcarriers. In the step 148, the preprocessed environmental CSI data corresponding to the inference time and the second selected environmental subcarriers, i.e., the preprocessed environmental CSI data with a size of [Ti× Nr0], are generated and stored. Therefore, previously selecting the first selected environmental subcarriers is beneficial to decrease a computing space for PCA, which usually requires a large computing space, in the selection for the second selected environmental subcarriers, and the preprocessed environmental CSI data with the reduced size contributing to the event classification are advantageous in effectively and accurately detecting the event. Furthermore, a time duration of the environmental CSI data obtaining step 130 and the environmental CSI data reducing step 140 of the event detection method 100 can be about 30 seconds.

Specifically, in the step 144, each of a plurality of environmental CSI amplitude sequences is formed by the amplitudes of the environmental CSI data of the time points of the inference time of a corresponding one of the original subcarriers and has a standard deviation. That is, each of the environmental CSI amplitude sequences is a time sequence or a time series. The first selected environmental subcarriers are selected in accordance with greatest ones (i.e., greatest Nr0) among the standard deviations of the respective original subcarriers. The first selected environmental subcarriers may be selected or decided periodically, e.g., in 5 minutes, from the original subcarriers in accordance with the most significant variation, e.g., the standard deviation of the environmental CSI amplitudes over time. In the step 147, a ratio of the number Nr0 of the second selected environmental subcarriers to the number Nt of the original subcarriers may be between 0.02 and 0.5. Therefore, the most variant subcarriers, which could reflect the dynamic change of the amplitudes of the environmental CSI data when the detected environment 20 is in the empty state, can be chosen for more accurately detecting the event.

For detecting the falling event, the inference time may be 4 seconds, and the number Ti of the time points of the inference time may be 400. That is, the environmental CSI data of each of the original subcarriers may be obtained at and respectively corresponding to 400 time points within the inference time of 4 seconds (i.e., the time interval is 10 ms). The number Nt of the original subcarriers may be 212, the number Ns0 of the first selected environmental subcarriers may be 32, and the number Nr0 of the second selected environmental subcarriers may be 10. Thus, the preprocessed environmental CSI data corresponding to the time points of the inference time and the second selected environmental subcarriers can be arranged in a two-dimensional array, matrix or tensor of [Ti×Nr0], and the size or number of the preprocessed environmental CSI data is [400×10]. The ratio of the number Nr0 of the second selected environmental subcarriers to the number Nt of the original subcarriers is about 0.047, and thereby the dimension or size of the preprocessed environmental CSI data is reduced.

Figure 1E:
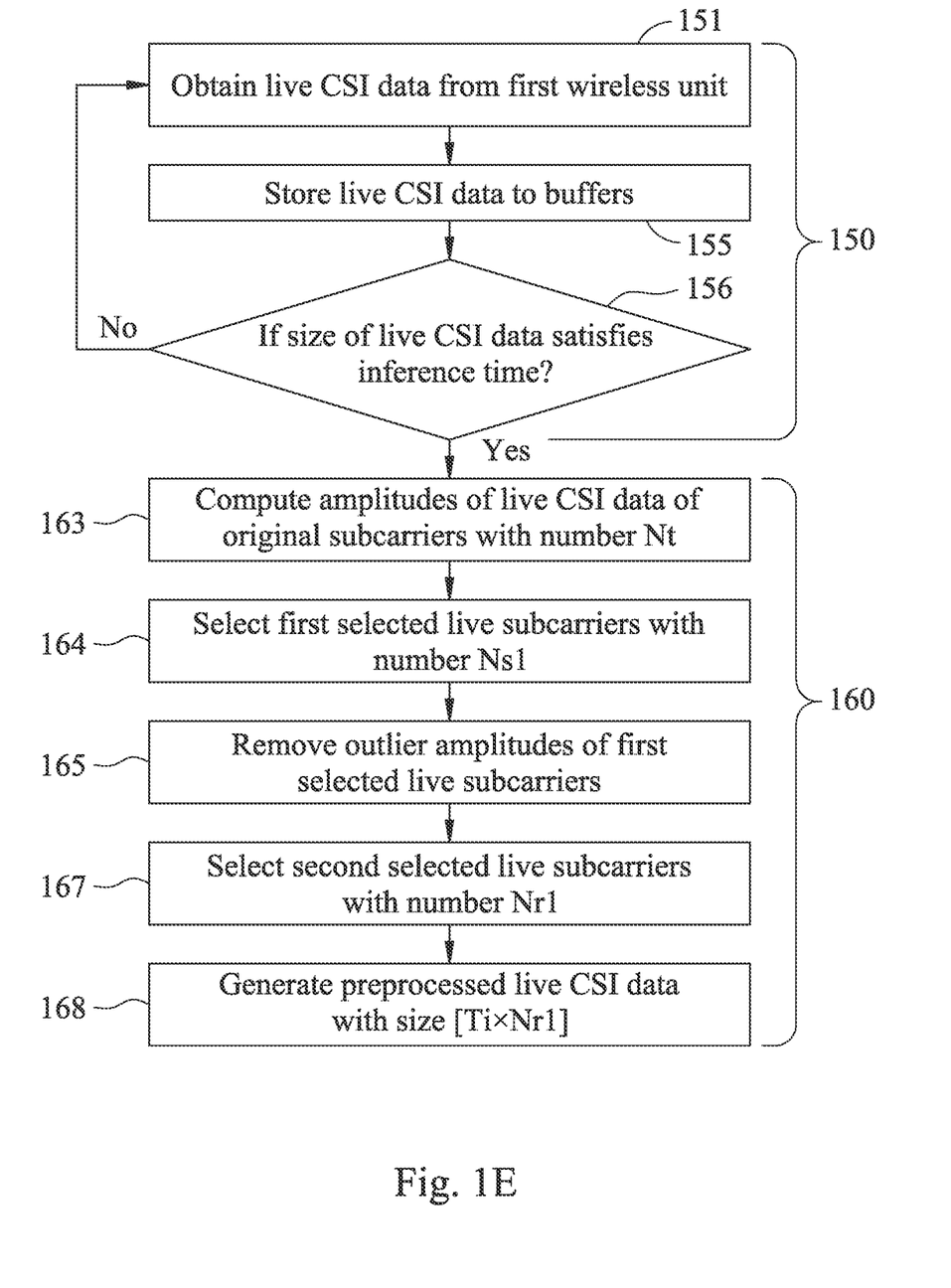
FIG. 1E is a flow chart of a live CSI data obtaining step and a live CSI data reducing step of the event detection method according to the 1st embodiment.

FIG. 1E is a flow chart of the live CSI data obtaining step 150 and the live CSI data reducing step 160 of the event detection method 100 according to the 1st embodiment. With reference to FIG. 1E, FIG. 2A and FIG. 2B, the live CSI data obtaining step 150 includes obtaining the live CSI data corresponding to the original subcarriers and the inference time from the first wireless unit 211, which may include steps 151, 155 and 156, as shown in FIG. 1E. The step 151 is obtaining the live CSI data of the original subcarriers from the first wireless unit 211. The step 155 is storing the live CSI data of the original subcarriers to buffers, i.e., buffering each time series of the live CSI data/packets of the original subcarriers. In the step 156, it is determined to be followed by the live CSI data reducing step 160 if the size of the live CSI data stored in the buffers is large enough to satisfy the inference time (i.e., the inference window size), or it is determined to return to the step 151 if the size of the live CSI data stored in the buffers is not large enough to satisfy the inference time.

The live CSI data reducing step 160 includes reducing the size of the live CSI data to generate the preprocessed live CSI data, which may include steps 163, 164, 165, 167 and 168, as shown in FIG. 1E. The step 163 is computing an amplitude of each of the live CSI data corresponding to the time points of the inference time and the original subcarriers, a number of the time points of the inference time is Ti, and the number of the original subcarriers is Nt. The step 164 is selecting a plurality of first selected live subcarriers (i.e., a subset of the original subcarriers) from the original subcarriers, in accordance with the amplitudes of the live CSI data corresponding to the time points of the inference time and the original subcarriers. A number of the first selected live subcarriers is Ns1, and the number Ns1 of the first selected live subcarriers is smaller than the number Nt of the original subcarriers. In the step 165, outliers, which may be caused by thermal noise or other electrical interference, among the amplitudes of the live CSI data corresponding to the time points of the inference time and the first selected live subcarriers are removed or set as a predetermined value. The step 167 is selecting a plurality of second selected live subcarriers (i.e., a subset of the first selected live subcarriers) from the first selected live subcarriers by PCA. A number of the second selected live subcarriers is Nr1, and the number Nr1 of the second selected live subcarriers is smaller than the number Ns1 of the first selected live subcarriers and equal to the number Nr0 of the second selected environmental subcarriers. In the step 168, the preprocessed live CSI data corresponding to the inference time and the second selected live subcarriers, i.e., the preprocessed live CSI data with a size of [Ti×Nr1], are generated. Therefore, the preprocessed live CSI data with the reduced size are advantageous in effectively detecting the event.

Specifically, in the step 164, each of a plurality of live CSI amplitude sequences is formed by the amplitudes of the live CSI data of the time points of the inference time of a corresponding one of the original subcarriers and has a standard deviation. That is, each of the live CSI amplitude sequences is a time sequence or a time series. The first selected live subcarriers are selected in accordance with greatest ones (i.e., greatest Nr1) among the standard deviations of the respective original subcarriers. The first selected live subcarriers may be selected or decided periodically, e.g., in 5 minutes, from the original subcarriers in accordance with the most significant variation, e.g., the standard deviation of the live CSI amplitudes over time. In the step 167, a ratio of the number Nr1 of the second selected live subcarriers to the number Nt of the original subcarriers may be between 0.02 and 0.5. Therefore, the most variant subcarriers, which could reflect the dynamic change of the amplitudes of the live CSI data when the person 23 or any other person is in the detected environment 20, can be chosen for more accurately detecting the event.

For detecting the falling event, the inference time may be 4 seconds, and the number Ti of the time points of the inference time may be 400. That is, the live CSI data of each of the original subcarriers may be obtained at and respectively corresponding to 400 time points within the inference time of 4 seconds (i.e., the time interval is 10 ms). The number Nt of the original subcarriers may be 212, the number Ns1 of the first selected live subcarriers may be 32, and the number Nr1 of the second selected live subcarriers may be 10. Thus, the preprocessed live CSI data corresponding to the time points of the inference time and the second selected live subcarriers can be arranged in a two-dimensional array, matrix or tensor of [Ti×Nr1], and the size or number of the preprocessed live CSI data is [400×10]. The ratio of the number Nr1 of the second selected live subcarriers to the number Nt of the original subcarriers is about 0.047, and thereby the dimension or size of the preprocessed live CSI data is reduced. In addition, in the step 114 of reducing the size of each of the aforementioned three kinds of the labeled CSI data in the classifier establishing step 110, the reducing manners for the data size may be substantially the same as those in the environmental CSI data reducing step 140 and the live CSI data reducing step 160, and a size or number of each of the aforementioned three kinds of the labeled CSI data after performing the step 114 may be [400×10], too. In another embodiment of the present disclosure, the first selected environmental subcarriers and the first selected live subcarriers are the same and determined in the step 114 of the classifier establishing step 110 with the most significant variation or standard deviation of CSI amplitudes over time.

With reference to FIG. 1B, FIG. 2A and FIG. 2B, the cooperating data obtaining step 170 includes obtaining the cooperating data from the cooperating detection device, which may include steps 170a and 170b, as shown in FIG. 1B. The step 170a is obtaining acceleration data from the accelerometer 240a, and the step 170b is obtaining sound data from the microphone 240b. For example, the acceleration or speed change characteristics increase sharply within one second before and after the falling event. After falling to the ground, the speed instantaneously approaches zero. The collection of sound data can be done by the microphone 240b to record surrounding audio volume and further to analyze the pattern of sound characteristics, so as to determine whether it is the falling event and to predict the distance at which the falling event occurs.

With reference to FIG. 1A, FIG. 1B, FIG. 2A and FIG. 2B, the event determining step 180 includes inputting the preprocessed environmental CSI data and the preprocessed live CSI data to the event classifier 216, and processing the cooperating data to determine if the event exists, which may include steps 181, 177a, 177b, 192, 170c, 177c and 193, as shown in FIG. 1B. The step 181 is classifying the preprocessed live CSI data corresponding to the inference time and the second selected live subcarriers. The step 177a is calculating the acceleration data, e.g., speed information, etc., to classify the acceleration data. The step 177b is calculating the sound data, e.g., volumes, frequencies, patterns, etc., of the sound characteristics, to classify the sound data. In the step 192, if a ratio of the preprocessed live CSI data, the acceleration data and the sound data being classified as the event is greater than a half (i.e., at least two of the preprocessed live CSI data, the acceleration data and the sound data being classified as the event), it is determined that the event likely exists so as to proceed to the step 170c. If not, it is determined to return to the steps 150, 170a and 170b. The step 170c is obtaining image data from the camera 240c, and the step 177c is calculating the image data, e.g., monitoring and checking the image data of the current detected environment 20, etc., to classify the image data. In the step 193, if the image data is classified as the event, it is determined that the event exists so as to proceed to the classification postprocessing step 194, as shown in FIG. 1A and FIG. 1B. If not, it is determined to return to the steps 150, 170a and 170b. Furthermore, a time duration of the live CSI data reducing step 160 and the event determining step 180 of the event detection method 100 can be no more than 1 second per time so that it will not miss any events, e.g., the falling event.

Figure 1F:
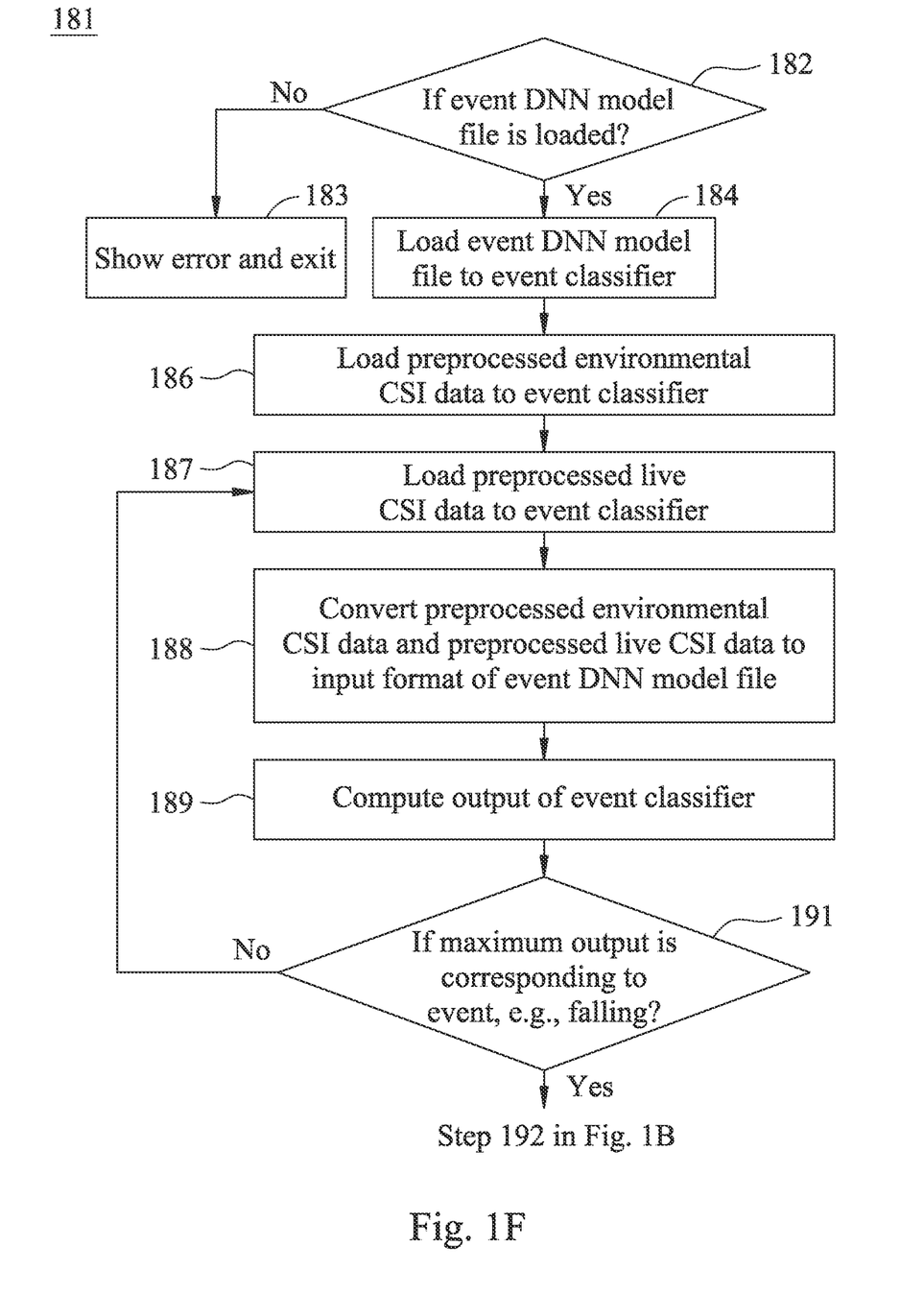
FIG. 1F is a flow chart of a step of classifying preprocessed live CSI data of an event determining step of the event detection method according to the 1st embodiment.

FIG. 1F is a flow chart of a step 181 of classifying the preprocessed live CSI data of the event determining step 180 of the event detection method 100 according to the 1st embodiment. With reference to FIG. 1F, FIG. 2A and FIG. 2B, the step 181 is classifying the preprocessed live CSI data, which may include steps 182, 183, 184, 186, 187, 188, 189 and 191, as shown in FIG. 1F. In the step 182, it is determined to proceed to the step 184 if the event DNN model file 217, which is exported in the step 118 shown in FIG. 1C, is loaded, or it is determined to proceed to the step 183 if the event DNN model file 217 is not loaded. The step 183 is showing error information and may be exiting the step 181. The step 184 is loading the event DNN model file 217 to the event classifier 216. In the steps 186 and 187, the preprocessed environmental CSI data and the preprocessed live CSI data, respectively, are loaded to the event classifier 216. The step 188 is converting the preprocessed environmental CSI data and the preprocessed live CSI data to an input format of the event DNN model file 217.

In the step 189, a classification output or result of the preprocessed live CSI data is calculated and generated by the event classifier 216 employing the event DNN model file 217 and a NN (Neural Network) computing library 218. There may be a plurality of off-the-shelf NN computing libraries 218, e.g., Tensor-Flow lite, PyTorch, Caffe, etc., for performing the neural network computation on the first wireless device 210. In addition, a neural network computing accelerator (not shown in drawings) may be optionally configured in the first wireless device 210 when the processor 213 is not powerful enough to compute the classification output within an expected time limitation, e.g., 1 second per time for the falling event. The classification output may be probabilities of the event and being not the event, and there may be one, two, or more kinds of being not the event. In the step 191, it is determined to proceed to the step 192 shown in FIG. 1B if the event has the maximum probability, or it is determined to return to the step 187 if the event does not have the maximum probability. In another embodiment of the present disclosure, the steps 182, 183, 184 and 186 may be skipped in the step 181 and performed between the environmental CSI data reducing step 140 and the live CSI data obtaining step 150.

With reference to FIG. 1A, FIG. 1B, FIG. 2A and FIG. 2B, in the step 193, if the image data is classified as the event, it is determined that the event exists so as to proceed to the classification postprocessing step 194, which may include steps 195, 196 and 197. The step 195 is obtaining the image data classified as the event and recording the location information of the detected environment 20. The step 196 is monitoring the status related to the event, e.g., the motion and breath status of the person 23 causing the falling event, by the existing camera 240c, the first wireless device 210 and the second wireless device 220. After the steps 195 and 196, a step 198 is performed with wirelessly or wiredly transmitting the data related to the event to a specific control/cloud center or sending a message to a contact person through the Wi-Fi or Ethernet communication. In the step 197, a loud or prolonged warning sound (or alarm tone) is generated by speaker 240d equipped in the detected environment 20, so as to raise the attention of the surrounding personnel for assisting.

Regarding the event detection system 200 according to the 2nd embodiment, it is described with an aid of the event detection method 100 according to the 1st embodiment. With reference to FIG. 1B, FIG. 2A and FIG. 2B, the event detection system 200 is for detecting if the event being predetermined exists in the detected environment 20. The event detection system 200 includes the first wireless unit 211, the at least one second wireless unit 222, the processor 213 and the memory 214.

The first wireless unit 211 is disposed in the detected environment 20. The at least one second wireless unit 222 is disposed in the detected environment 20 and wirelessly communicating with the first wireless unit 211. The processor 213 is coupled to the first wireless unit 211. The memory 214 is coupled to the processor 213 and configured to provide the event detection module 215, which includes the event classifier 216. The memory 214 is a non-transitory computer-readable memory or a non-volatile memory, and the event detection module 215 is software program codes, but not limited thereto. The processor 213 may be a central processing unit (CPU) or a processing unit specialized in detecting the event of the first wireless device 210. The processor 213 in accordance with the event detection module 215 is configured to obtain the environmental CSI data corresponding to the original subcarriers and the inference time from the first wireless unit 211 when the detected environment 20 is in the empty state, wherein the environmental CSI data are wirelessly transmitted from the at least one second wireless unit 222 to the first wireless unit 211, reduce the size of the environmental CSI data to generate and store as the preprocessed environmental CSI data, obtain the live CSI data corresponding to the original subcarriers and the inference time from the first wireless unit 211, wherein the live CSI data are wirelessly transmitted from the at least one second wireless unit 222 to the first wireless unit 211, reduce the size of the live CSI data to generate the preprocessed live CSI data, and input the preprocessed environmental CSI data and the preprocessed live CSI data to the event classifier 216 to determine if the event exists. That is, the environmental CSI data obtaining step 130, the environmental CSI data reducing step 140, the live CSI data obtaining step 150, the live CSI data reducing step 160 and the event determining step 180 of the event detection method 100 can be performed. Therefore, the event detection system 200 can be implemented as a non-contact system for detecting the event.

The event detection system 200 may further include the at least one cooperating detection device, which is at least one of the camera 240c, the microphone 240b and the accelerometer 240a, coupled to the processor 213 and disposed in the detected environment 20. The processor 213 in accordance with the event detection module 215 is configured to further obtain the cooperating data from the cooperating detection device, and input the preprocessed environmental CSI data and the preprocessed live CSI data to the event classifier 216 and further process the cooperating data to determine if the event exists. That is, the cooperating data obtaining step 170 and the event determining step 180 of the event detection method 100 can be performed. Therefore, the event detection system 200 includes several sensing detectors at the same time, i.e., integrates multiple detection manners, and thereby confirms at multiple levels to reduce the missing rate of detecting the event. Moreover, the camera 240c can be installed on the ceiling or the wall to record the image of the detected environment 20. The respective installing angles of the camera 240c, the first wireless device 210 and the second wireless device 220 are adjusted to capture the event occurring on the ground. The microphone 240b can be provided in the camera 240c, the speaker 240d, the first wireless device 210 or attached alone to the ground/floor, the ceiling or the wall.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An event detection method, for detecting if an event being predetermined exists in a detected environment, in which a first wireless unit and at least one second wireless unit wirelessly communicating with the first wireless unit are disposed, the event detection method comprising:
   a classifier establishing step comprising establishing an event classifier;
   an environmental CSI data obtaining step comprising obtaining a plurality of environmental CSI data corresponding to a plurality of original subcarriers and an inference time from the first wireless unit when the detected environment is in an empty state, wherein the environmental CSI data are wirelessly transmitted from the at least one second wireless unit to the first wireless unit, and the environmental CSI data are arranged as a two-dimensional array based on the original subcarriers and a plurality of time points of the inference time;
   an environmental CSI data reducing step comprising reducing a size of the environmental CSI data to generate and store as a plurality of preprocessed environmental CSI data;
   a live CSI data obtaining step comprising obtaining a plurality of live CSI data corresponding to the original subcarriers and the inference time from the first wireless unit, wherein the live CSI data are wirelessly transmitted from the at least one second wireless unit to the first wireless unit, and the live CSI data are arranged as a two-dimensional array based on the original subcarriers and the time points of the inference time;
   a live CSI data reducing step comprising reducing a size of the live CSI data to generate a plurality of preprocessed live CSI data; and
   an event determining step comprising inputting the preprocessed environmental CSI data and the preprocessed live CSI data to the event classifier to determine if the event exists.

2. The event detection method of claim 1, wherein the environmental CSI data reducing step comprises:
   computing an amplitude of each of the environmental CSI data corresponding to the time points of the inference time and the original subcarriers;
   selecting a plurality of first selected environmental subcarriers from the original subcarriers in accordance with the amplitudes, wherein a number of the first selected environmental subcarriers is smaller than a number of the original subcarriers;
   selecting a plurality of second selected environmental subcarriers from the first selected environmental subcarriers by PCA (Principal Component Analysis), wherein a number of the second selected environmental subcarriers is smaller than the number of the first selected environmental subcarriers; and
   generating and storing the preprocessed environmental CSI data, which are corresponding to the inference time and the second selected environmental subcarriers.

3. The event detection method of claim 2, wherein each of a plurality of environmental CSI amplitude sequences is formed by the amplitudes of the inference time of a corresponding one of the original subcarriers and has a standard deviation, and the first selected environmental subcarriers are selected in accordance with greatest ones among the standard deviations of the respective original subcarriers.

4. The event detection method of claim 2, wherein the live CSI data reducing step comprises:

computing an amplitude of each of the live CSI data corresponding to the time points of the inference time and the original subcarriers;

selecting a plurality of first selected live subcarriers from the original subcarriers in accordance with the amplitudes, wherein a number of the first selected live subcarriers is smaller than the number of the original subcarriers;

selecting a plurality of second selected live subcarriers from the first selected live subcarriers by PCA, wherein a number of the second selected live subcarriers is smaller than the number of the first selected live subcarriers and equal to the number of the second selected environmental subcarriers; and generating the preprocessed live CSI data, which are corresponding to the inference time and the second selected live subcarriers.

5. The event detection method of claim 4, wherein each of a plurality of live CSI amplitude sequences is formed by the amplitudes of the inference time of a corresponding one of the original subcarriers and has a standard deviation, and the first selected live subcarriers are selected in accordance with greatest ones among the standard deviations of the respective original subcarriers.

6. The event detection method of claim 1, wherein the event classifier is a deep neural network classifier and trained by a plurality of labeled CSI data received under the event in at least one environment, a plurality of labeled CSI data received under at least one event other than the event in the at least one environment, and a plurality of labeled CSI data received in the at least one environment in the empty state.

7. The event detection method of claim 6, wherein the event is a falling event.

8. The event detection method of claim 1, wherein at least one cooperating detection device is further disposed in the detected environment, and the event detection method further comprises:

a cooperating data obtaining step comprising obtaining a plurality of cooperating data from the cooperating detection device, which is at least one of a camera, a microphone and an accelerometer;

wherein the event determining step further comprises processing the cooperating data to determine if the event exists.

9. An event detection system, for detecting if an event being predetermined exists in a detected environment, the event detection system comprising:

a first wireless unit disposed in the detected environment;

at least one second wireless unit disposed in the detected environment and wirelessly communicating with the first wireless unit;

a processor coupled to the first wireless unit; and a memory coupled to the processor and configured to provide an event detection module, which comprises an event classifier;

wherein the processor in accordance with the event detection module is configured to:

obtain a plurality of environmental CSI data corresponding to a plurality of original subcarriers and an inference time from the first wireless unit when the detected environment is in an empty state, wherein the environmental CSI data are wirelessly transmitted from the at least one second wireless unit to the first wireless unit, and the environmental CSI data are arranged as a two-dimensional array based on the original subcarriers and a plurality of time points of the inference time;

reduce a size of the environmental CSI data to generate and store as a plurality of preprocessed environmental CSI data;

obtain a plurality of live CSI data corresponding to the original subcarriers and the inference time from the first wireless unit, wherein the live CSI data are wirelessly transmitted from the at least one second wireless unit to the first wireless unit, and the live CSI data are arranged as a two-dimensional array based on the original subcarriers and the time points of the inference time;

reduce a size of the live CSI data to generate a plurality of preprocessed live CSI data; and input the preprocessed environmental CSI data and the preprocessed live CSI data to the event classifier to determine if the event exists.

10. The event detection system of claim 9, wherein the processor in accordance with the event detection module is configured to reduce the size of the live CSI data by:

computing an amplitude of each of the live CSI data corresponding to the time points of the inference time and the original subcarriers;

selecting a plurality of first selected live subcarriers from the original subcarriers in accordance with the amplitudes, wherein a number of the first selected live subcarriers is smaller than a number of the original subcarriers;

selecting a plurality of second selected live subcarriers from the first selected live subcarriers by PCA, wherein a number of the second selected live subcarriers is smaller than the number of the first selected live subcarriers; and generating the preprocessed live CSI data, which are corresponding to the inference time and the second selected live subcarriers.

11. The event detection system of claim 10, wherein each of a plurality of live CSI amplitude sequences is formed by the amplitudes of the inference time of a corresponding one of the original subcarriers and has a standard deviation, and the first selected live subcarriers are selected in accordance with greatest ones among the standard deviations of the respective original subcarriers.

12. The event detection system of claim 9, wherein the event classifier is a deep neural network classifier and trained by a plurality of labeled CSI data received under the event in at least one environment, a plurality of labeled CSI data received under at least one event other than the event in the at least one environment, and a plurality of labeled CSI data received in the at least one environment in the empty state.

13. The event detection system of claim 12, wherein the event is a falling event.

14. The event detection system of claim 9, further comprising:

at least one cooperating detection device disposed in the detected environment and coupled to the processor, wherein the cooperating detection device is at least one of a camera, a microphone and an accelerometer;

wherein the processor in accordance with the event detection module is configured to further:

obtain a plurality of cooperating data from the cooperating detection device; and input the preprocessed environmental CSI data and the preprocessed live CSI data to the event classifier and further process the cooperating data to determine if the event exists.

* * * * *